Krauser & Ritter,
Hydrant,
№ 13,792. Patented Nov. 13, 1855.
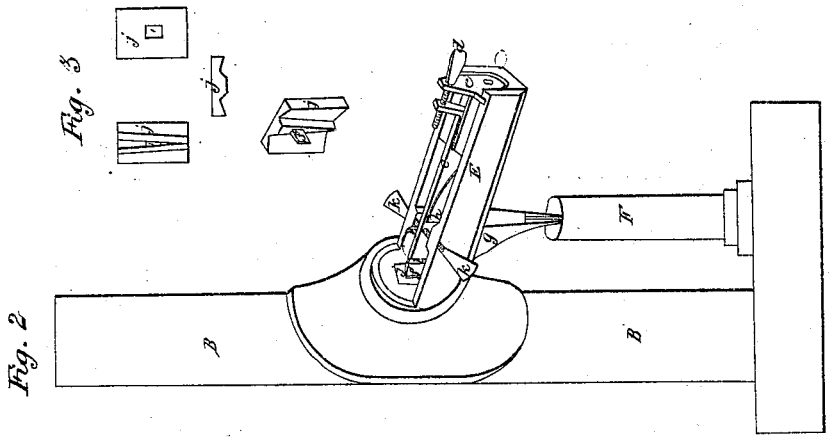
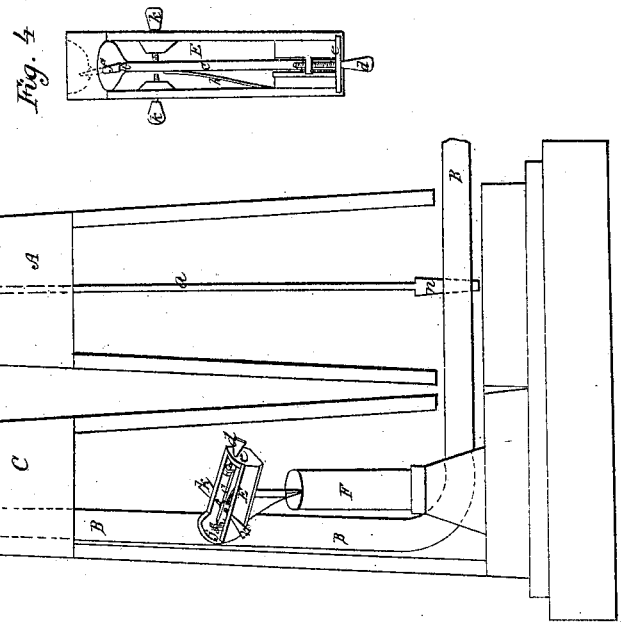

UNITED STATES PATENT OFFICE.

S. KRAUSER AND C. RITTER, OF READING, PENNSYLVANIA.

WATER-METER.

Specification of Letters Patent No. 13,792, dated November 13, 1855.

*To all whom it may concern:*

Be it known that we, SAMUEL KRAUSER and CHRISTIAN RITTER, of the city of Reading, in the county of Berks and State of Pennsylvania, have invented certain new and useful Improvements in Water-Meters; and we do hereby declare the following to be a full, clear, and exact description of the same, reference being had to the accompanying drawings, making a part thereof, in which—

Figure 1 represents an elevation hydrant and meter stocks, with a portion cut away, to show the interior arrangement. Fig. 2, represents the meter as connected with its stock, on a more enlarged scale. Fig. 3, represents several separate views of the slotted plate through and in which the wedge shaped plug passes, and is made adjustable. Fig. 4, represents a top view of the regulating apparatus, detached from the stock.

Similar letters in the several figures, denote like parts.

The nature of our invention relates to the measuring of the quantity of water that is drawn from or through a hydrant or draw cock, by means of the flow of a small quantity of the water through a regulating apparatus, which is caught and retained in a vessel, wherein it may be measured, as will be hereafter described.

A, Fig. 1, represents the hydrant stock as usually employed, and B, the supply pipe leading from the main, or other source, and entering the stock near its base.

$n$, is a spigot or cock, for opening or closing the water way in the pipe B; it is furnished with a rod $a$, extending up through the stock on the top of which is a handle $b$, for operating the spigot. It is a common occurrence for the spigot to get out of repair, and it may be desirable to remove the entire stock, to repair it, or to replace it with a new one. Should the meter, therefore, be attached to this stock A, it would necessarily be subject to many casualities or derangements, as well as to improper inspection, and its correctness as a meter might be deemed unreliable. To avoid these, and other difficulties incident to such an arrangement, we employ another stock C, placed along side of the one A, and the pipe B, is conducted into this second stock C, near its base, thence upward to the top of the stock, and outward, for the purpose of discharging its contents at the nozzle D in the usual well known way. By this arrangement it will be seen that while the spigot and handle are attached to the stock A, the water is drawn from the nozzle of the stock C, within which the meter is placed, as will be presently described. By thus arranging the double stocks, the pipe B, may be cut off, and entirely removed if necessary under or near the stock A, without disturbing the meter in the other stock C, or even opening it to inspection.

E, is what may be called the meter, as by it, the small quantity allowed to pass through it (which is an exactly regulated quantity), indicates the quantity that has been drawn off at D, or that has passed through the pipe B. A single drop of water passing through E, into the receiver F, when it is retained, may represent a gallon, or a barrel drawn off at D, as the meter may have been previously regulated for; and by examining or measuring the quantity in the receiver F, at stated periods, which is subject to access or inspection, by the properly qualified person, the exact quantity of water which has passed through the hydrant may be readily ascertained. The meter E, is a semitube inserted at any point between the spigot $n$, and the nozzle D, but the nearer it is placed to the nozzle the better, as it is less subject there, to the waste water in the hydrant. A stem or rod $c$ passes through the semitube, or trough shaped piece E, longitudinally, and has its rear end bent up, so as to receive a set screw $d$, which passes through the end $e$, of the trough, and into said bent end of the stem or rod, for a purpose to be presently described. The front end of the stem or rod $c$, has upon it a wedge shaped plug $f$, which is slightly oblique to the line of the rod, and immediately in rear of said plug, is a drip $i$, for causing the water which follows the plug $f$, to drop into and through the funnel $g$, into the receiver F. A spring $h$, presses against one side of the rod or stem $c$, for the purpose of forcing the plug $f$, to one side of the slot $i$ (Fig. 3) in the plate $j$, which is placed in the front end of the meter E. The water which passes from the pipe B, into the meter, passes on one side of the plug $f$, between it, and the slot $i$, and on that side on which the spring $h$, is placed, said spring being for the purpose of holding the plug away from the opening $i$.

$k$, $k$, are set screws for holding or adjusting the plug on the stem. The set screw $d$, is for adjusting the plug, in a longitudinal direction, and the spring $h$, and set screws $k$, for adjusting it in a lateral direction, and perform important functions in the action of the meter, as the space between the plug and the side of the slot in which it is placed must be very exact.

The plate $j$, through which the plug $f$, passes is plain on its outer face (as seen on the right hand of Fig. 3), but on its other side, or that which is next the water in the pipe B, it is formed into tapering grooves or recesses (as seen in the remaining views of Fig. 3). The object of these grooves, is to direct any solid matter that may be in the water, away from the slot, and thus prevent it from being obstructed.

The position of the meter, between the spigot and the nozzle is important, inasmuch as the measuring takes place only, while the water is being drawn from the hydrant, or when the spigot is opened. If placed the other side of the spigot it would be actuated by the pressure of the water in the pipe, without the opening of the spigot, and consequently would not serve the purpose designed for it.

Having thus fully described the nature of our invention we would state that, we are aware the dividing of the gas, which passes through the gas meter, into two or more portions, and ascertaining the whole quantity, by measuring a part thereof, when under pressure, instead of measuring all the gas which passes through the meter, as heretofore, has been essayed. This we do not claim, but—

What we do claim herein as new, and desire to secure by Letters Patent, is—

1. Measuring or indicating the passage of a quantity of water through a pipe, by allowing a small graduated portion thereof to escape and waste into a measuring and retaining receiver, or other vessel, employed for that purpose, by means substantially such as herein described.

2. We also claim in combination with the rod $c$, and plug $f$, the spring and adjusting screws, for the purpose of regulating the passage for the water through and into the meter, as described and set forth.

3. We also claim the drip, in rear of the plug to cause the water from the slot, to drop into the funnel, and thence into the receiver as described.

4. We also claim the inclined angular recesses on each side of the slot, on the inner face of the plate $j$, for the purpose of carrying away from the slot, any impurity or solid matter in the water as described.

SAML. KRAUSER.
CHRISTIAN RITTER.

Witnesses:
Wm. B. Schoeuez,
Asaph Thenfelder.